United States Patent [19]

Menting

[11] Patent Number: 4,543,374

[45] Date of Patent: Sep. 24, 1985

[54] FURAN FOUNDRY BINDER SYSTEM CONTAINING A CURING PROMOTER

[75] Inventor: James E. Menting, Algonquin, Ill.

[73] Assignee: QO Chemicals, Inc., Chicago, Ill.

[21] Appl. No.: 669,648

[22] Filed: Nov. 8, 1984

[51] Int. Cl.[4] ............................................. C08K 3/36
[52] U.S. Cl. ................................ 523/144; 525/327.2; 526/270; 528/249; 528/367; 528/417
[58] Field of Search ................... 523/144; 525/327.2; 526/270; 528/249, 367, 417

[56] References Cited

U.S. PATENT DOCUMENTS

| | | | |
|---|---|---|---|
| 3,700,604 | 12/1972 | Metil | 525/327.2 |
| 4,381,813 | 5/1983 | Kottke | 523/144 |
| 4,383,098 | 5/1983 | Menting | 526/270 |
| 4,474,636 | 10/1984 | Bogner | 526/270 |

*Primary Examiner*—Lewis T. Jacobs
*Attorney, Agent, or Firm*—Neuman, Williams, Anderson & Olson

[57] ABSTRACT

A binder composition for foundry molds and cores comprising a furan based binder, a metal sulfonate curing catalyst therefor and a cure promoter selected from copper chloride, zinc chloride and iron chloride.

5 Claims, No Drawings

FURAN FOUNDRY BINDER SYSTEM CONTAINING A CURING PROMOTER

This invention relates to the metal foundry art and more particularly to novel compositions and methods for producing foundry molds and cores.

A number of methods are employed in modern foundries in the production of cured foundry molds and cores. Each of these methods addresses, to some extent, the needs for high productivity, environmental safety, reduction of breakage and loss, short operational downtime, low equipment cost and lowered energy costs. The three most commonly practiced foundry methods are the (1) "hot box", (2) "gassing" and (3) "no-bake" methods. The hot box type binders are generally preferred for certain applications because they are inexpensive, because they produce generally satisfactory results and because they are well suited to high volume production, particularly production of ordinary iron castings.

In present foundry practice, it is customary to form a core for a casting by filling a heated pattern cavity with a core forming material which comprises core sand mixed with a resin and a catalyst. Desirably, when the core sand material is mixed and placed in the mold, the high temperatures on the order of 250°–500° F. and above cause rapid curing of the resin, which binds the core sand, making a core which is capable of easy removal from the pattern, which has high strength so as to withstand rough handling, and which is stable so as to permit storage over a long period of time.

A number of "hot box" binder and catalyst systems have been prepared, including "furan based" binders catalyzed with aliphatic or aromatic sulfonic acid salts. Thus, U.S. Pat. No. 4,317,763 relates to foundry core sands using furan based binders which are catalyzed with aliphatic or aromatic sulfonic acid salts, the disclosure of which is incorporated herein.

It has now been found that improved foundry core sand or mold compositions can be obtained with such binder-catalyst systems by incorporating in the system relatively small amounts of a metal salt cure promoter selected from copper chloride, zinc chloride and iron chloride. Incorporation of these metal salts into a furan binder-sulfonate catalyst unexpectedly and markedly improves the hot tensile strength and through cure of the foundry sand cores or molds made therefrom. By hot tensile strength is meant the tensile strength at the time the core is removed from the hot box. By through cure is meant thorough curing of the binder throughout the entire sand mix even though the ultimate cure is not effected at the time the core sand is removed from the heated pattern.

The expression "core sand" is sometimes used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

Thus, the present invention provides a binder-catalyst system particularly adapted for producing foundry core sands by admixing with sand a furan binder, a sulfonate catalyst and a metal salt cure promoter, and heating to a temperature of at least about 250° F. The binder-catalyst system comprises a furan based binder, an aliphatic or aromatic sulfonate curing catalyst and copper chloride or zinc chloride or iron chloride as a curing promoter. The invention provides a method of preparing a core sand material adapted for the production of sand shapes which involves treating a core sand with a metal sulfonate curing catalyst and a cure promoter selected from copper chloride, zinc chloride and iron chloride, and a furan based binder, and heating the treated core sand to a temperature of at least 250° F. to cure the binder.

The binder material used according to this invention is a furan based binder, which is one which contains derivatives of furan, particularly including furfuryl alcohol polymers, whether used alone or used with other resins such as phenolic resins, urea formaldehyde resins or mixtures thereof. The furfuryl alcohol polymers include those polymers prepared by reacting furfuryl alcohol with itself, with formaldehyde or with urea. These resins are commercially available and include resins identified as "QUA-CORR ®1001" resin, or FaRez ® B-270 furan-based resin supplied by QO Chemicals, Inc. of Chicago, Ill. The binder is used in an amount of from about 0.5 to 5% by weight of the sand.

The sulfonate catalysts used to cure the furan binder are those made from a weak base and an aliphatic or aromatic sulfonic acid as disclosed in U.S. Pat. No. 4,317,763. These include, for example, aluminum phenol sulfonates, aluminum toluene sulfonate, aluminum methane sulfonate, aluminum benzene sulfonate, aluminum xylene sulfonate, copper phenol sulfonate, copper toluene sulfonate, zinc toluene sulfonate, zinc phenol sulfonate, iron toluene sulfonate, iron xylene sulfonate, copper benzene sulfonate and the like. The sulfonate catalyst is employed in an amount from about 5 to 40% by weight of the binder. Advantageously, these sulfonate catalysts can be employed in the form of an aqueous solution thereof, such as a 50% by weight aqueous solution. In preferred practice, the sulfonate catalyst is admixed with the core sand followed by addition of the binder thereto.

The metal salt cure promoters, namely copper chloride ($CuCl_2$), zinc chloride ($ZnCl_2$) or iron chloride ($FeCl_3$) are preferably admixed with the sulfonate catalyst, preferably dissolved in water, or the promoters can be added to the sand-binder-catalyst mix separately such as in the form of an aqueous solution.

The sands which are employed can be of various types conventionally used in making foundry articles, with neutral or acidic sands generally being preferred, although basic sands can be utilized. Thus, for example, the core or mold sand can be pure quartz sand (99% silica), lake sand (95% silica), chromite sand, zircon sand, sea sand and so forth.

When employing the compositions of this invention to produce a cured sand shape, it is preferred to employ a silane adhesion promoter in an amount ranging from 0.1 percent to 3 percent based on the weight of the binder in such composition. The silane is preferably admixed into the binder composition prior to its admixture onto the sand. Such silane adhesion promoters are well known in the art and include, for example, gamma-mercaptopropyltrimethoxysilane, N-beta-(aminoethyl)-gamma-aminopropyltrimethoxysilane, beta-(3,4-epoxycyclohexyl)ethyltrimethoxysilane, gamma-glycidoxypropyltrimethoxysilane, gamma-aminopropyltriphenoxysilane, gamma-aminopropyltribenzoyoxysilane, gamma-aminopropyltrifurfuroxysilane, gamma-aminopropyltri(o-chlorophenoxy)silane, gamma-aminopropyltri(tetrahydrofurfuroxy)silane, methyl[2-gamma-triethoxysilypropylamino)ethyl amino]3-propionate in methanol, modified aminoorganosilane, Ureido-silane, mercaptoethyltriethoxysilane, chloropropyltrimethoxysilane, vinyltrichlorosilane, vinyltriethoxysilane, vinyltrimethoxy-silane, gamma-methacryloxypropyl-trimethoxysilane, gamma-methacryloxypropyltri(2-methoxyethoxy)silane, gamma-glycidoxy-propyltrimethoxysilane, vinyltriacetoxysilane, gamma-mercaptopropyltrimethoxysilane, gamma-aminopropyltriethoxysilane, N-beta(aminoethyl)-gamma-aminopropyltrimethoxysilane.

The following examples illustrate the advantages of incorporating in the binder-catalyst system a cure promoter as disclosed herein. In the following examples the furan resin binder was one comprising approximately 67 parts furfuryl alcohol, 14 parts of a methylated urea-formaldehyde resin (Beetle 65, available from American Cyanamid Company, Wayne, N.J.), 14 parts of a phenolic novolac resin (Plenco 1617, available from Plastics Engineering Company, Sheboygan, Wis.), 5 parts of a vinyl acetate polymer (Gelva V 1½, available from Monsanto Company, St. Louis, Mo.) and 0.3 parts of a silane adhesion promoter. In all tests the mold temperature was 450° F.

In making tests to determine the desirable characteristics of the present invention, various dwell times were used. The dwell time is the length of time the catalyzed resin-and-sand mixture remains in the heated pattern cavity before being removed therefrom for testing purposes.

The strength which the sand product possesses is determined by making a so-called "biscuit" or briquette of sand, that is, a formation of sand shaped in a characteristic way (a "dog bone" 0 shape) and bonded by the resin being tested. After the so-called biscuit is formed, it is placed in a machine adapted to determine what the tensile and ultimate yield strengths of the part thus formed are. The shape of a typical briquette or biscuit is well known to those skilled in the art and, accordingly, the characteristics thereof are not discussed further herein. For example, however, reference is made to such typical biscuit in a book entitled "Steel Foundry Practice", by J.H. Hall, (Penton Publishing Co., Cleveland, Ohio 1950) where such unit is shown and described on page 8.

By "bench life", it is meant the time during which the catalyst may remain mixed with the binder before a substantial portion of the polymerization reactions begins to take place. It is preferable that such binders have bench lives equal to at least the length of one working shift, and preferably an hour or more longer than that, i.e., bench lives of eight to twelve, or even twenty-four hours.

The test results are summarized in each example.

EXAMPLE 1

The above-indicated binder was employed with Badger silica sand in an amount of 1.5% by weight of sand. The base catalyst was copper toluene sulfonate having admixed therewith methanol and water. The specific make-up of the base catalyst was 35 parts copper toluene sulfonate, 7 parts toluene sulonic acid, 15 parts water and 43 parts methanol.

TABLE 1

| Catalyst | % Catalyst/Binder | Bench Life | HOT 5 sec. Dwell | HOT 20 sec. Dwell | 30 minute cold 5 sec. Dwell | 30 minute cold 20 sec. Dwell | ON—HH 5 sec. Dwell | ON—HH 20 sec. Dwell |
|---|---|---|---|---|---|---|---|---|
| Base Catalyst | 25 | >17 | 35 | 65 | 60 | 383 | 62 | 208 |
| Base Catalyst + 5% CuCl$_2$ | 20 | — | 38 | 50 | 90 | 308 | 70 | 195 |
| Base Catalyst + 10% CuCl$_2$ | 20 | >17 | 30 | 56 | 110 | 472 | 128 | 200 |
| Base Catalyst + 15% CuCl$_2$ | | | 40 | 63 | 255 | 325 | 140 | 196 |

EXAMPLE 2

The above-indicated binder was employed with Wedron 5025 silica sand in an amount of 1.5% by weight of sand. The base catalyst was the same as in Example 1.

TABLE 2

| Catalyst | % Catalyst/Binder | HOT 5 sec. Dwell | HOT 20 sec. Dwell | 30 minute cold 5 sec. Dwell | 30 minute cold 20 sec. Dwell | ON—HH 5 sec. Dwell | ON—HH 20 sec. Dwell |
|---|---|---|---|---|---|---|---|
| Base Catalyst | 25 | 52 | 67 | 784 | 762 | 332 | 362 |
| Base Catalyst + 15% CuCl$_2$ | 25 | 68 | 100 | 705 | 720 | 319 | 342 |

EXAMPLE 3

The above-indicated binder was employed with Wedron 5025 silica sand in an amount of 1.5% by weight of the sand. The base catalyst was that of Example 1.

TABLE 3

| Catalyst | % Catalyst/Binder | HOT 5 sec. Dwell | HOT 20 sec. Dwell | 30 minute cold 5 sec. Dwell | 30 minute cold 20 sec. Dwell | ON—HH 5 sec. Dwell | ON—HH 20 sec. Dwelling |
|---|---|---|---|---|---|---|---|
| Base Catalyst | 25 | 20 | 23 | 589 | 635 | 281 | 365 |
| Base Catalyst + 20% CuCl$_2$* | 25 | 40 | 68 | 746 | 737 | 572 | 525 |
| Base Catalyst | 25 | 45 | 67 | 749 | 739 | 472 | 492 |

TABLE 3-continued

| Catalyst | % Catalyst/Binder | HOT 5 sec. Dwell | 20 sec. Dwell | 30 minute cold 5 sec. Dwell | 20 sec. Dwell | ON—HH 5 sec. Dwell | 20 sec. Dwelling |
|---|---|---|---|---|---|---|---|
| + 15% CuCl₂ | | | | | | | |

*Added as a 40% by weight aqueous solution

EXAMPLE 4

The above-indicated binder was employed with Badger silica sand in an amount of 1.5% by weight. The base catalyst was the same as in Example 1.

TABLE 4

| Catalyst | % Catalyst/Binder | Bench Life | HOT 5 sec. Dwell | 10 sec. Dwell | 20 sec. Dwell | 30 minute cold 5 sec. Dwell | 20 sec. Dwell | ON—HH* |
|---|---|---|---|---|---|---|---|---|
| Base Catalyst | 40 | >17 | 13 | 15 | 23 | 40 | 461 | 212 |
| Base Catalyst + 5% ZnCl₂ | 40 | <17 | 10 | 15 | 35 | 224 | 513 | 241 |

*Average of 20 & 30 second dwell times.

EXAMPLE 5

The above-indicated binder was employed with Badger silica sand in an amount of 1.5% by weight. The base catalyst was the same as in Example 1.

TABLE 5

| Catalyst | % Catalyst/Binder | Bench Life | HOT 5 sec. Dwell | 10 sec. Dwell | 20 sec. Dwell | 30 minute cold 5 sec. Dwell | 10 sec. Dwell | 20 sec. Dwell | ON—HH 20 sec. Dwell |
|---|---|---|---|---|---|---|---|---|---|
| Base Catalyst | 20 | >17 | <10 | 10 | 15 | 15 | 130 | 414 | 247 |
| Base Catalyst + 5% FeCl₃ | 20 | <17 | <10 | 10 | 13 | 14 | 151 | 366 | 182 |
| Base Catalyst + 10% FeCl₃ | 20 | <17 | <10 | 10 | 13 | 43 | 225 | 399 | 178 |
| Base Catalyst + 15% FeCl₃ | 20 | <17 | <10 | 10 | 16 | 78 | 272 | 421 | 176 |

EXAMPLE 6

The above-indicated binder was employed with Badger silica sand in an amount of 1.5% by weight. The base catalyst was the same as in Example 1.

TABLE 6

| Catalyst | % Catalyst/Binder | Bench Life | HOT 5 sec. Dwell | 10 sec. Dwell | 20 sec. Dwell | 30 minute cold 5 sec. Dwell | 20 sec. Dwell | ON—HH* |
|---|---|---|---|---|---|---|---|---|
| Base Catalyst | 40 | >17 | 13 | 15 | 23 | 40 | 461 | 212 |
| Base Catalyst + 5% FeCl₃ | 40 | <17 | 10 | 12 | 22 | 122 | 452 | 230 |
| Base Catalyst + 10% FeCl₃ | 40 | <17 | 12 | 20 | 46 | 338 | 517 | 225 |
| Base Catalyst + 15% FeCl₃ | 40 | <17 | 10 | 15 | 25 | 228 | 391 | 230 |

*Average of 20 & 30 second dwell times.

Those modifications and equivalents which fall within the spirit of the invention are to be considered a part thereof.

What is claimed is:

1. A binder composition adapted to be cured at a temperature of at least about 250° F. comprising a furan based binder, a metal sulfonate curing catalyst therefor and a cure promoter selected from copper chloride, zinc chloride and iron chloride.

2. A treated core sand material capable of being formed into a predetermined shape and bound by an acid curable resin at a temperature of at least about 250° F. so as to retain a shape for use in metal founding, said treated core sand material containing core sand, a furan based binder, a metal sulfonate curing catalyst for said binder and a cure promoter selected from copper chloride, zinc chloride and iron chloride.

3. A method of preparing a core sand material adapted for the production of sand shapes at a temperature of at least about 250° F. which comprises treating a core sand with a furan based binder, a metal sulfonate curing catalyst for said binder and a cure promoter selected from copper chloride, zinc chloride and iron chloride.

4. A method according to claim 3 wherein the core sand is first admixed with a metal sulfonate curing catalyst and a cure promotor selected from copper chloride, zinc chloride and iron chloride and then the treated sand is admixed with a furan based binder.

5. A method of controlling the curing properties of a furan based binder used in the manufacture of sand shapes, said method including adding to the sand used to form said sand shapes a metal sulfonate curing catalyst and a curing promoter selected from copper chloride, zinc chloride and iron chloride, mixing with the treated sand a furan binder and then curing said binder at a temperature of at least about 250° F.

* * * * *